(12) United States Patent
Kim et al.

(10) Patent No.: US 8,872,999 B2
(45) Date of Patent: Oct. 28, 2014

(54) BACKLIGHT ASSEMBLY AND LIQUID CRYSTAL DISPLAY INCLUDING THE SAME

(75) Inventors: Min-Seop Kim, Yongin (KR); Yun-Jae Kim, Yongin (KR); Hwan-Jin Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 281 days.

(21) Appl. No.: 12/926,428

(22) Filed: Nov. 17, 2010

(65) Prior Publication Data

US 2011/0194049 A1     Aug. 11, 2011

(30) Foreign Application Priority Data

Feb. 11, 2010   (KR) .................. 10-2010-0012886

(51) Int. Cl.
*G02F 1/1335*   (2006.01)
*F21V 7/04*   (2006.01)
*F21V 8/00*   (2006.01)

(52) U.S. Cl.
CPC .................................... *G02B 6/0091* (2013.01)
USPC ............................... 349/65; 349/62; 362/632

(58) Field of Classification Search
USPC ........... 349/58–60, 62, 65; 362/621, 632–634
See application file for complete search history.

(56) References Cited

U.S. PATENT DOCUMENTS

2007/0085941 A1*  4/2007  Chang et al. .................... 349/58
2008/0055517 A1*  3/2008  Yu .................................... 349/65

FOREIGN PATENT DOCUMENTS

| JP | 2005-173302 A | 6/2005 |
| JP | 2007-149587 A | 6/2007 |
| KR | 10 2003-0032204 A | 4/2003 |
| KR | 10 2006-0042605 A | 5/2006 |
| KR | 10 2007-0058183 A | 6/2007 |
| KR | 10 2009-0032669 A | 4/2009 |

* cited by examiner

*Primary Examiner* — Jessica M Merlin
(74) *Attorney, Agent, or Firm* — Lee & Morse, P.C.

(57) ABSTRACT

A backlight assembly includes a light source, a light guide plate configured to receive and diffuse light emitted from the light source, and a mold frame including a central opening part configured to receive the light guide plate, an attachment opening part adjacent to the central opening part, the attachment opening part being configured to receive the light source, and a protrusion in the attachment opening part, the protrusion contacting the light source in the attachment opening.

19 Claims, 7 Drawing Sheets

BACKLIGHT ASSEMBLY AND LIQUID CRYSTAL DISPLAY INCLUDING THE SAME

BACKGROUND

1. Field

The described technology relates generally to a backlight assembly and a liquid crystal display including the same, and more specifically, to a backlight assembly with a mold frame and a liquid crystal display including the same.

2. Description of the Related Art

A liquid crystal display (LCD) may replace the existing cathode ray tube (CRT) display due to its thinness, lightweight, low power consumption, etc. For example, the LCD may be used for small-sized products, e.g., mobile phones, personal digital assistants (PDAs), portable multimedia players (PMPs), etc., and for medium and large-sized products, e.g., monitors, TVs, etc.

The LCD may include a separate light source. For example, the LCD may include a backlight assembly with a light source to display images.

The above information disclosed in this Background section is only for enhancement of understanding of the background of the described technology and therefore it may contain information that does not form the prior art that is already known in this country to a person of ordinary skill in the art.

SUMMARY

Embodiments are therefore directed to a backlight assembly and a LCD including the same, which substantially overcome one or more of the problems due to the limitations and disadvantages of the related art.

It is therefore a feature of an embodiment to provide a backlight assembly having a mold frame with protrusions to facilitate a close attachment between a light source and a light guide plate, thereby leading to a wedge effect.

It is therefore another feature of an embodiment to provide a LCD including a backlight assembly having a mold frame with protrusions to facilitate a close attachment between a light source and a light guide plate, thereby improving luminance and suppressing defects.

At least one of the above and other features and advantages may be realized by providing a backlight assembly, including a light source, a light guide plate configured to receive and diffuse light emitted from the light source, and a mold frame having a central opening part configured to receive the light guide plate, an attachment opening part adjacent to the central opening part, the attachment opening part being configured to receive the light source, and a protrusion in the attachment opening part, the protrusion contacting the light source in the attachment opening.

The light source may be a light emitting diode.

A distance from one side of the attachment opening part in which the protrusion is formed to one edge of the light guide plate contacting the light source may be smaller than or equal to a sum the width of the light source and the width of the protrusion that are measured along the same direction as the distance.

The protrusion may be formed in a tetrahedral shape having an inclined line facing the light source or the protrusion may be formed in a pentagonal shape having an inclined surface facing the light source.

The protrusion may be made of the same material as the mold frame such that it may be integrally formed with the mold frame or may be formed of an elastic body.

The central opening part may be integral with the attachment opening part, the protrusion being on an edge of the attachment opening part and facing the central opening part. The light source may be inside the attachment opening part, the light source contacting the protrusion and the light guide plate.

The protrusion may include an inclined edge or surface facing the light source, the light source being between the protrusion and the light guide plate. The light may be pressed between the protrusion and the light guide plate.

At least one of the above and other features and advantages may also be realized by providing a LCD device, including a LCD panel and a backlight assembly having a light source, a light guide plate that receives and diffuses light emitted from the light source, and a mold frame, the mold frame having a central opening receiving the light guide plate and an attachment opening part disposed to be adjacent to one side of the central opening part and receiving the light source, wherein one side of the attachment opening part may be provided with a protrusion so that the light source is received to be fitted in the attachment opening.

The light source may be a light emitting diode.

A distance from one side of the attachment opening part in which the protrusion is formed to one edge of the light guide plate contacting the light source may be smaller than or equal to a sum the width of the light source and the width of the protrusion that are measured along the same direction as the distance.

The protrusion may be formed in a tetrahedral shape having an inclined line in a direction where the light source is inserted or the protrusion may be formed in a pentagonal shape having an inclined surface in a direction where the light source is inserted.

The protrusion may be made of the same material as the mold frame such that it may be integrally formed with the mold frame or may be formed of an elastic body.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0012886, filed on Feb. 11, 2010, in the Korean Intellectual Property Office, and entitled: "Backlight Assembly And Liquid Crystal Display Including The Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
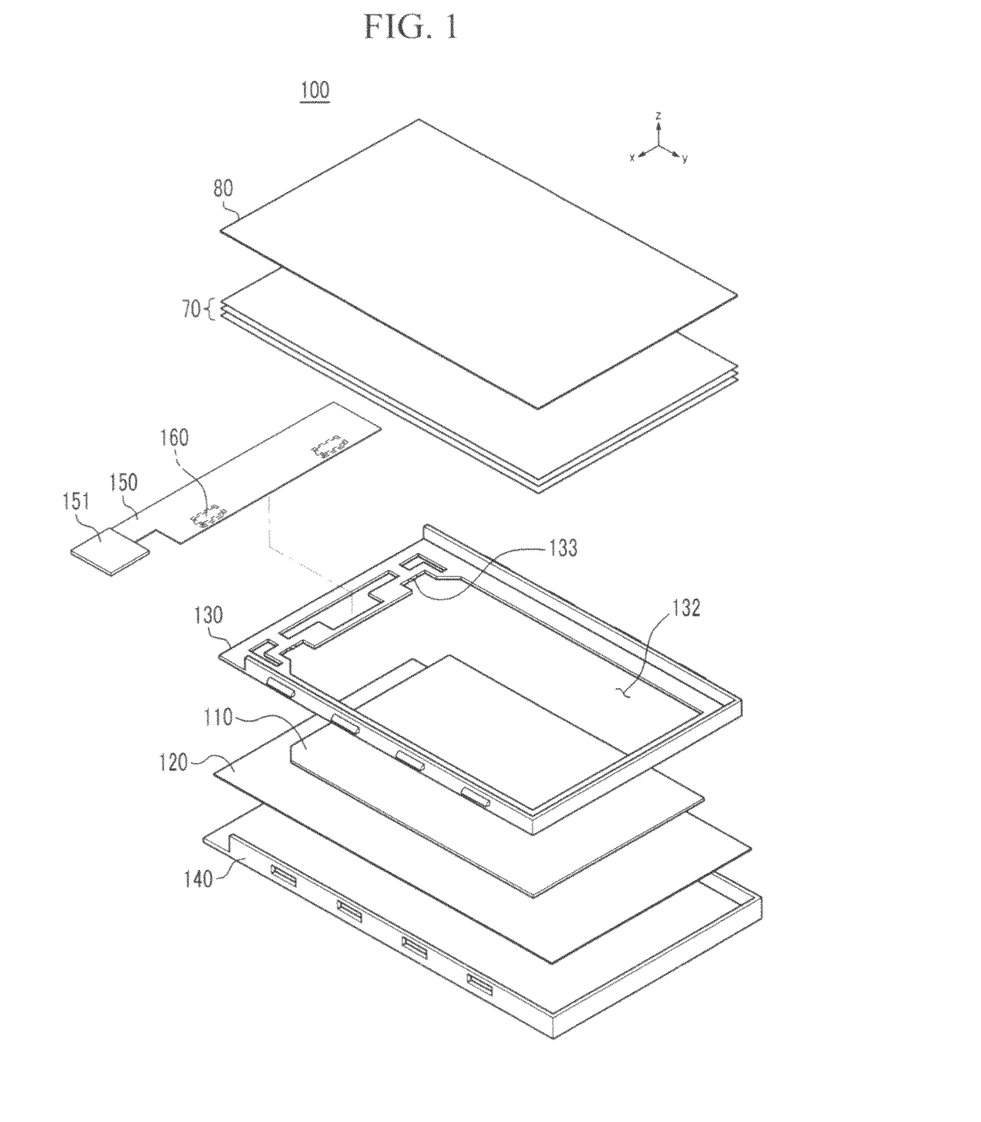
FIG. 1 illustrates an exploded perspective view of a backlight assembly according to an exemplary embodiment.

FIG. 1 illustrates an exploded perspective view of a backlight assembly 100 according to an exemplary embodiment. Referring to FIG. 1, the backlight assembly 100 according to an exemplary embodiment may include a light source 160, a light guide plate 110, and a mold frame 130. In addition, the backlight assembly 100 may include a reflective member 120, a printed circuit film 150, optical members 70, and an adhesive member 80. The backlight assembly 100 may further include a lower fixing member 140 for receiving components of the backlight assembly 100.

In the present exemplary embodiment, the light source 160 may be any suitable light source, e.g., a light emitting diode (LED) 160. Similarly, the printed circuit film 150 may be any suitable printed circuit film, e.g., a flexible printed circuit (FPC) film 150. Hereinafter, for convenience, the light source will be referred to as LED 160, and the printed circuit film will be referred to as FPC film 150.

The LED 160 may be mounted on the FPC film 150. The FPC film 150 may be provided with a plurality of wire patterns (not shown), and may be electrically connected to the LED 160. Therefore, when the FPC film 150 is applied with a driving voltage from the outside through a connection part 151, it may be possible to drive the LED 160. It is noted that although FIG. 1 illustrates two LEDs 160 mounted on the FPC film 150, other configurations of LEDs are within the scope of the exemplary embodiments, e.g., a different number of LEDs 160 can be used according to the size and use of the backlight assembly 100.

The mold frame 130 may receive the FPC film 150 on which the LED 160 is mounted and the light guide plate 110. In detail, the mold frame 130 may be a frame surrounding a central opening part 132. Therefore, the light guide plate 110 may be received, e.g., may be inserted to fit, in the central opening part 132 of the mold frame 130, and the FPC film 150 with the LED 160 may be fixed on an edge of the mold frame 130, i.e., adjacent to the light guide plate 110 in the central opening part 132. As illustrated in FIG. 1, the light guide plate 110 and the FPC film 150 may be arranged on opposite surfaces of the mold frame 130, so the LED 160 on the FPC film 150 may face and overlap a portion of the light guide plate 110. Therefore, light emitted from the LED 160 may be incident on a side of the light guide plate 110, and the light guide plate 110 may guide the incident light and uniformly diffuse it toward the front of the light guide plate 110. Uniform light diffusion, i.e., uniform light incidence from the LED 160 toward the light guide plate 110, may provide uniform luminance of the backlight assembly 100.

Referring to FIG. 1, the reflective member 120 may be disposed below the light guide plate 110, i.e., in the lower (−Z) direction, and the optical member 70 may be disposed above the light guide plate 110, i.e., in the upper direction (+Z). Therefore, light diffused by the light guide plate 110 may be emitted in the upper direction toward the optical member 70. Light emitted in the lower direction may be reflected from the reflective member 120 back toward the optical member 70. The arrangement of the light guide plate 110, the reflective member 120, and the optical member 70 may minimize light loss.

The mold frame 130 may further receive the optical member 70 and the adhesive member 80 in addition to the light guide plate 110 and FPC film 150. For example, when the backlight assembly 100 is used in a LCD device, the adhesive member 80 may be used to attach a display panel (not shown) to the backlight assembly 100. Further, the reflective member 120 may be attached to a lower portion of the mold frame 130, e.g., the reflective member 120 may be attached to the mold frame 130 with the light guide plate 110 therebetween. In this configuration, the mold frame 130 may directly contact other components of the backlight assembly 100, such that it can be made of buffer materials to protect other components by absorbing the external impact. For example, the lower fixing member 140 may be coupled with the mold frame 130 to protect the components of the backlight assembly 100 from external impacts, and may be made of metal materials, e.g., stainless steel, etc.

Figure 2:
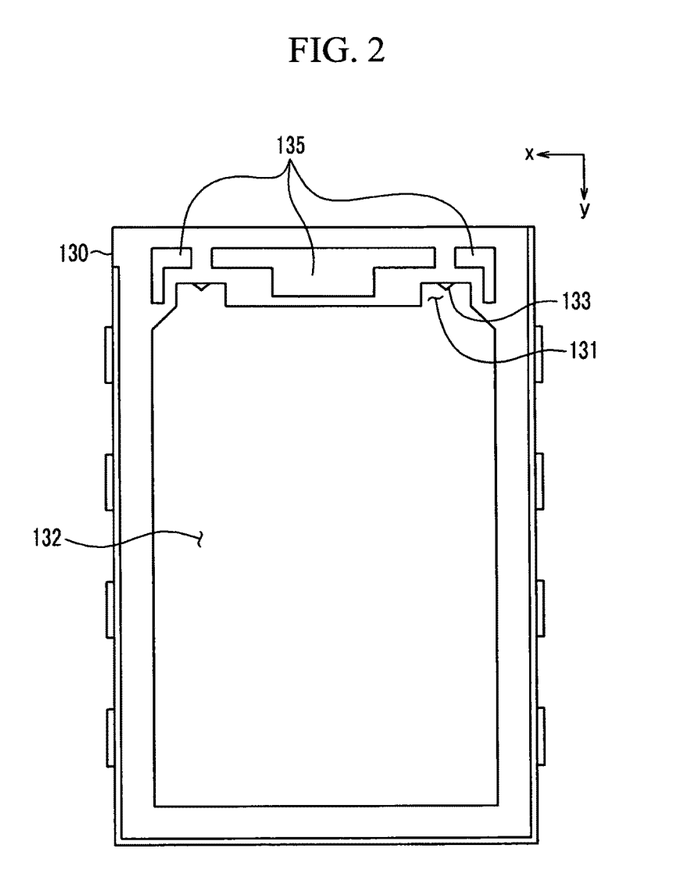
FIG. 2 illustrates a plan view of a mold frame according to an exemplary embodiment.
Figure 3:
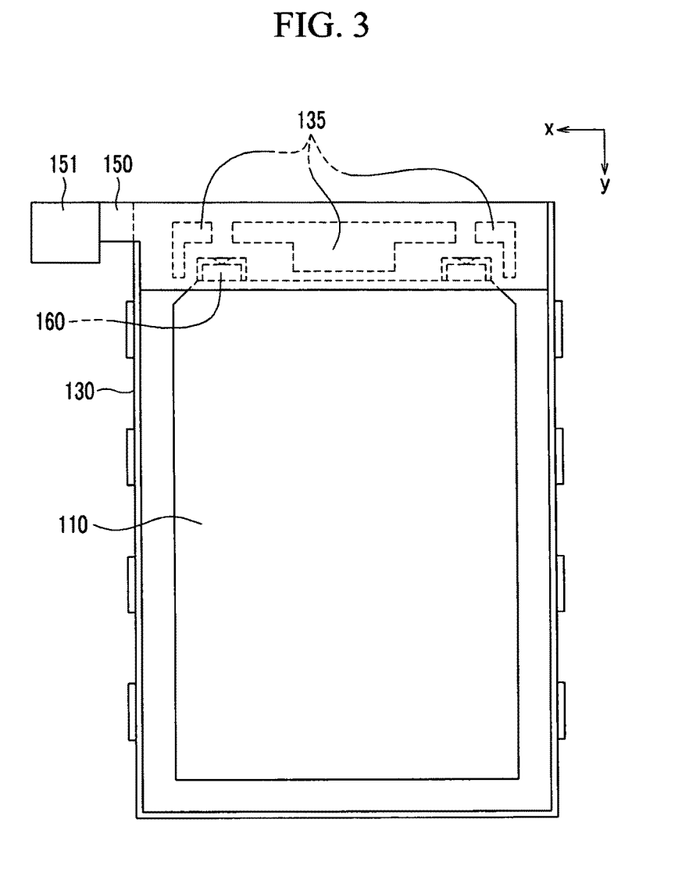
FIG. 3 illustrates a plan view showing a coupling state of a light guide plate, a mold frame, and a printed circuit film, according to an exemplary embodiment.
Figure 4:
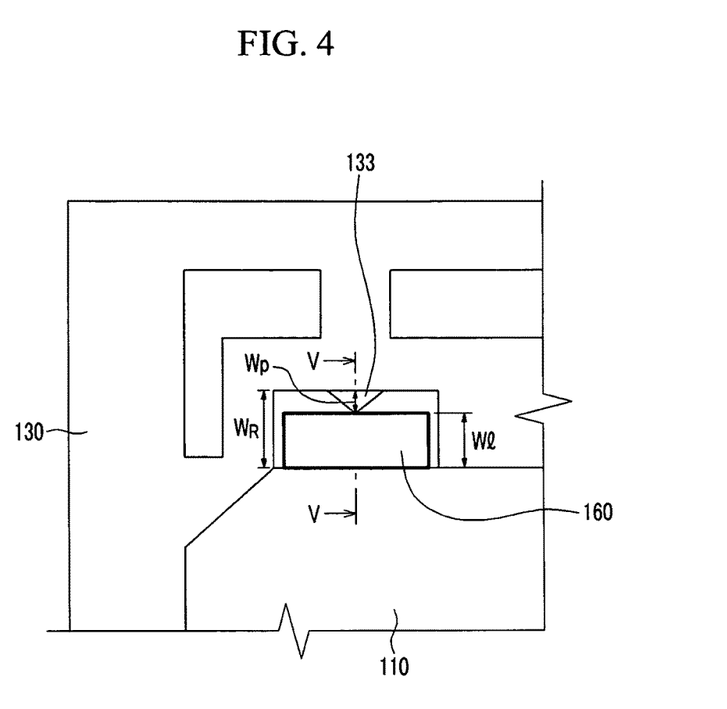
FIG. 4 illustrates a partial, enlarged diagram of the coupling state of FIG. 3.
Figure 5:
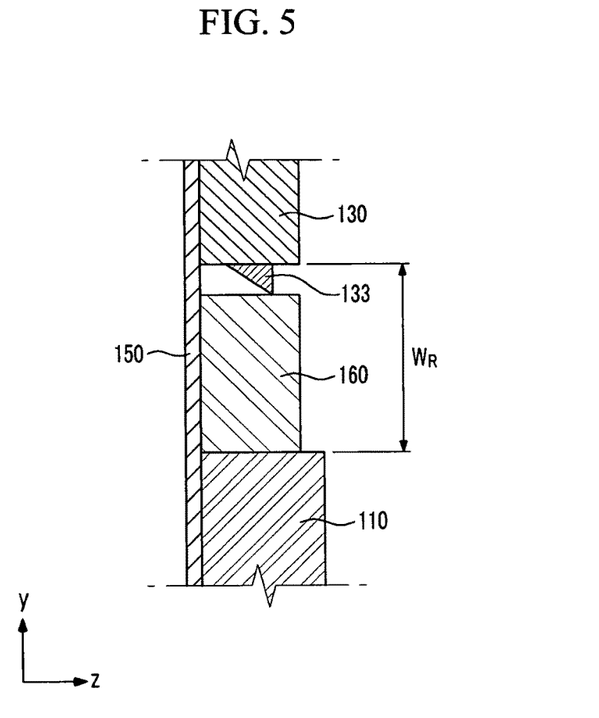
FIG. 5 illustrates a cross-sectional view taken along line V-V of FIG. 4.

Hereinafter, a detailed description of a configuration of the light guide plate 110 and the FPC film 150 received in the mold frame 130 will be described with reference to FIGS. 2-5. FIG. 2 illustrates a plan view of the mold frame 130, FIG. 3 illustrates a plan view of the light guide plate 110 and the FPC film 150 in the mold frame 130, FIG. 4 illustrates an enlarged view of the LED 160 in the mold frame 130, and FIG. 5 illustrates a cross-sectional view along line V-V of FIG. 4.

Referring to FIG. 2, the mold frame 130 may be a frame surrounding the central opening part 132. Further, one side of the frame of the mold frame 130 may include an attachment opening part 131 and a circuit element receiving part 135. For example, the attachment opening part 131 may be integral with the central opening part 132, i.e., the attachment opening part 131 may extend from the central opening part 132 toward the circuit element receiving part 135. As described above, the central opening part 132 of the mold frame 130 may receive the light guide plate 110. The attachment opening part 131 may receive the LED 160 mounted in the FPC film 150. That is, in order to drive the backlight assembly 100, the necessary circuit elements are mounted on the FPC film 150, e.g., the LED 160, so the FPC film 150 may be received in the circuit element receiving part 135, and the LED 160 on the FPC film 150 may be received, e.g., inserted to fit, in the attachment opening part 131.

It is noted that although FIG. 2 illustrates two attachment opening parts 131 in the mold frame 130 along a short side of the mold frame 130, exemplary embodiments are not limited thereto, e.g., the attachment opening parts 131 may be formed in any number and/or along the long side of the mold frame 130 according to the size, use, etc. of the backlight assembly 100. It is further noted that when the number of LEDs 160 is formed differently, the number of mold frames 130 may be formed differently. In addition, the circuit element receiving part 135 may be formed in different shapes according to the number or position of the attachment opening parts 131.

The mold frame 130 according to the present exemplary embodiment may further include a protrusion 133 formed at one side of the attachment opening part 131, e.g., one protrusion 133 in each of the attachment opening parts 131. As shown in FIG. 2, the protrusion 133 may protrude in a direction that faces from one side of the attachment opening part 131 to an opposite edge of the mold frame 130. In other words, the protrusion 133 may extend from a first side of the mold frame 130 including the attachment opening part 131 toward a second side of the mold frame 130 opposite the first side, i.e., the protrusion 133 may extend into the attachment opening part 131 along the y-axis. The protrusion 133 will be described in more detail below with reference to FIGS. 4-6A.

Referring to FIGS. 3 to 5, the light guide plate 110 may be received in the central opening part 132 of the mold frame 130, and the LED 160 may be received in the attachment opening part 131. As the protrusion 133 is formed on the mold frame 130 to extend into the attachment opening part 131, as illustrated in FIGS. 3 to 5, LED 160 may fit in the attachment opening part 131 between the light guide plate 110 and the protrusion 133 on the mold frame 130.

As a result, the protrusion 133 may suppress a gap among the mold frame 130, the LED 160, and the light guide plate 110. In detail, as illustrated in FIG. 4, a width of the LED 160 along the y-axis may be $W_L$, and a width of the attachment opening part 131 along the y-axis may be $W_R$. As the width of the attachment opening part 131 may be larger than the width of the LED 160, i.e., $W_R > W_L$, the protrusion 133 with a width $W_P$ may suppress a potential gap among the mold frame 130, the LED 160, and the light guide plate 110. The width $W_P$ of the protrusion 133 may be formed to be equal to or larger than a difference between the widths of the attachment opening part 131 and the LED 160, i.e., $W_P \geq W_R - W_L$, so that the LED 160 may be fitted between the mold frame 130 and the light guide plate 110.

In the above described configuration, the protrusion 133 may be formed in the attachment opening part 131 of the mold frame 130 to fit the LED 160 therein, such that the LED 160 may be closely attached to the light guide plate 110. As a result, light emitted from the LED 160 may be incident on the light guide plate 110 without loss, thereby making it possible to improve the emission luminance of the backlight assembly 100. In addition, as the LED 160 is firmly fixed to the mold frame 130, occurrence of defects, e.g., excitation or separation of the FPC film 150, may be suppressed. In contrast, when a light source in a conventional backlight assembly is not closely attached to a light guide plate, a gap generated therebetween may cause light loss and reduce luminance.

Figure 6A:
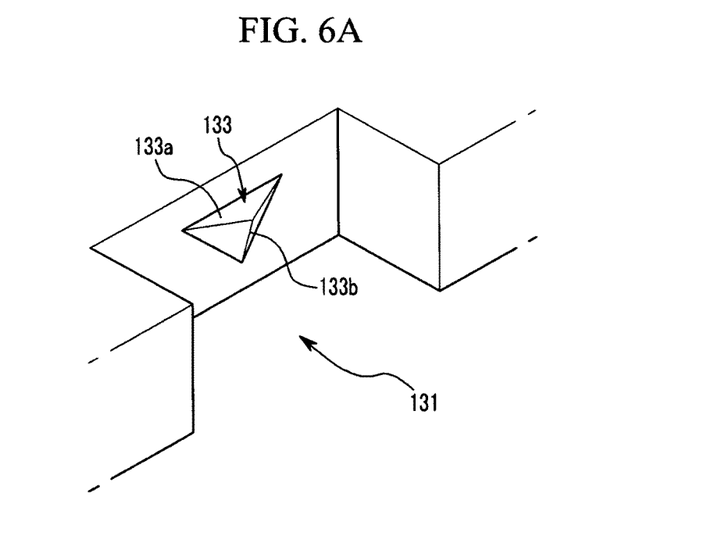
FIG. 6A illustrates a perspective view of a protrusion according to an exemplary embodiment.

The shape and function of the protrusion 133 formed in the attachment opening part 131 will be described in detail with reference to FIGS. 6A and 6B. For example, as illustrated in FIG. 6A, the protrusion 133 formed at one side of the attachment opening part 131 may have a tetrahedral shape, so an upper triangular surface 133a thereof may face the optical element 70 (see FIGS. 1 and 6A), e.g., the upper triangular surface 133a may be substantially parallel to a surface of the frame mold 133 supporting the FPC film 150. The LED 160 mounted on the FPC film 150 may be inserted into the attachment opening part 131, and may be closely attached to the protrusion 133 along an inclined line 133b, i.e., an inclined edge, of the protrusion 133. For example, the LED 160 may be first inserted into the attachment opening part 131 to contact the inclined line 133b, followed by attachment of the light guide plate 110 to the mold frame 130, such that the light guide plate 110 may press the LED 160 against the inclined line 133b of the protrusion 133 70 (see FIGS. 5 and 6A). As such, the protrusion 133 may form a wedge between the LED 160 and the mold frame 130 (FIG. 5), thereby leading to the wedge effect. As a result, the LED 160 may be more firmly coupled to the mold frame 130. In addition, the LED 160 may be more closely attached to the light guide plate 110 by the force pushing the LED 160 from the protrusion 133, i.e., by the inclined line 133b, toward the light guide plate 110.

Figure 6B:
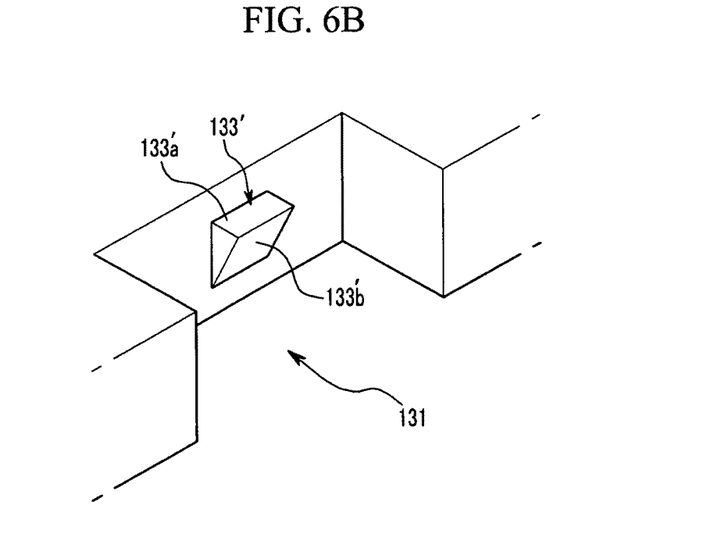
FIG. 6B illustrates a perspective view of a protrusion according to another exemplary embodiment.

Referring to FIG. 6B, in another exemplary embodiment, a protrusion 133' formed on one side of the attachment opening part 131 may be formed to have a pentagonal shape with an upper surface 133'a having a quadrangular shape. As discussed previously with reference to FIG. 6A, when the protrusion 133' is formed in a pentagonal shape, the LED 160 may be closely attached to the protrusion 133' along an inclined surface 133'b of the protrusion 133'. In particular, when the LED 160 is inserted into the attachment opening part 131 along the inclined surface 133'b, the LED 160 and the inclined surface 133'b may define a contact surface, thereby leading to the wedge effect. As a result, the LED 160 may be more firmly coupled to the mold frame 130. In addition, the LED 160 may be more closely attached to the light guide plate 110 by generating a force pushing the LED 160 from the protrusion 133', i.e., from the inclined surface 133'b, toward the light guide plate 110.

It is noted that although the exemplary embodiments describe the protrusion 133 as having a tetrahedral or a pentagonal shape, exemplary embodiments are not limited thereto. That is, the protrusion may have any structure that can line-contact or surface-contact the LED 160 to generate a wedge effect when the LED is inserted in the attachment opening part 131 to fit the LED therein.

The protrusions 133 and 133' according to the exemplary embodiments may be made of the same material as the mold frame 130, e.g., the protrusions 133 and 133' may be integrally formed with the mold frame 130. However, exemplary embodiments are not limited thereto, e.g., the protrusions 133 and 133' may be formed separately from the mold frame 130 so that they may be attached to the mold frame 130 using an adhesive, etc. For example, the protrusions 133 and 133' may be made of materials exhibiting strength and elasticity, so that they may not be easily damaged or deformed, e.g., by pressure when mounting the LED 160 or by an external impact.

Referring back to FIGS. 2 and 3, the circuit element receiving part 135 may be formed at an outer edge of the attachment opening part 131 in the mold frame 130, so that the circuit element receiving part 135 may receive other circuit elements for driving the backlight assembly 100. For example, the circuit element receiving part 135 may be positioned at the outer edge of the attachment opening part 131, so that the thickness of the mold frame 130 on the upper portion of the attachment opening part 131 may be substantially reduced, thereby increasing elasticity thereof. Therefore, the insertion process of the LED 160 in the attachment opening 131 in the fitting scheme may be easily made.

Figure 7:
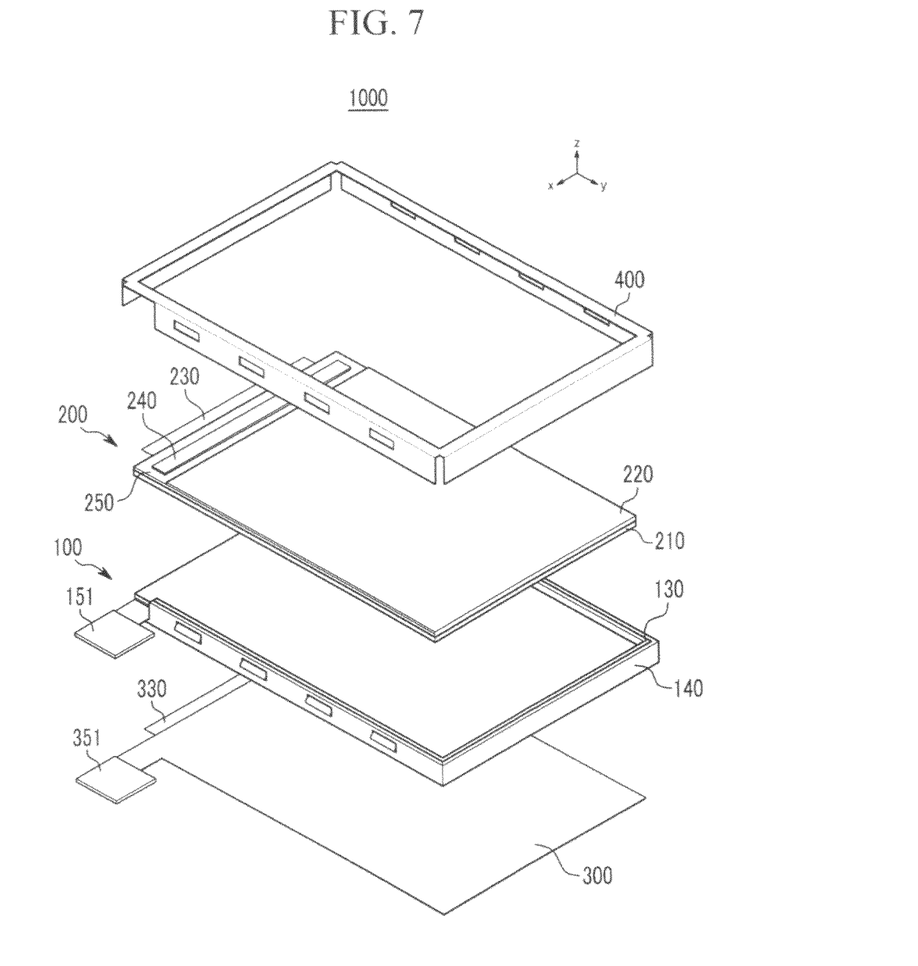
FIG. 7 illustrates an exploded perspective view of LCD device according to an exemplary embodiment.

The backlight assembly 100 according to exemplary embodiments may be used as a backlight of a display device, e.g., a LCD device. Hereinafter, the backlight assembly 100 as used in a LCD device will be described with reference to FIG. 7. FIG. 7 illustrates an exploded perspective view of a LCD 1000 including the backlight assembly 100.

Referring to FIG. 7, the LCD 1000 may include a LCD panel 200 and the backlight assembly 100. The components of the backlight assembly 100 are described above with reference to FIGS. 1-6B and, therefore, their detailed description will not be repeated.

The LCD panel 200 may be electrically connected to a printed circuit board 300 through printed circuit films 230 and 330. The printed circuit films 230 and 330 may be connected to the connection parts 151 and 351, respectively. The printed circuit board 300 supplies the driving voltage to the light source, e.g., the LED 160, through the connection parts 151 and 351.

The LCD panel 200 may include a thin film transistor (TFT) panel 210, a color filter panel 220, and a liquid crystal (not shown) injected between the TFT and color filter panels 210 and 220. The TFT panel 210 and the color filter panel 220 are disposed to be opposite to each other, and a plurality of TFTs in the TFT panel 210 may be formed in a matrix form. A data line is connected to a source terminal of the TFT panel 210, a gate line is connected to a gate terminal, and a drain terminal is formed with a pixel electrode made of conductive and transparent indium tin oxide (ITO).

The data line and the gate line of the TFT panel 210 are connected to the printed circuit board 300, such that the electrical signals are input to the source terminal and the gate terminal of the TFT when electrical signals are input to the printed circuit board 300. The TFT is turned-on or turned-off according to the input of the electrical signals, such that the electrical signals necessary to form the pixels are output to the drain terminal. An integrated circuit chip 240 may be mounted on the TFT panel 210 to control the LCD panel 200. The integrated circuit chip 240 may generate a plurality of timing signals to apply data driving signals and gate driving signals at an appropriate time, followed by application of the data and gate driving signals to the data and gate lines of the LCD panel 200, respectively. A protective layer 250 may be coated around the integrated circuit chip 240 to protect the integrated circuit chip 240.

The color filter panel 220 may be disposed on the upper portion of the TFT panel 210, and may include a substrate on which RGB pixels, i.e., color pixels expressing predetermined colors while passing through light, are formed by a thin film process. A common electrode made of ITO may be coated on a front surface of the substrate.

Power is applied to the gate terminal and the source terminal of the TFT to turn-on the TFT, thereby forming an electric field between the pixel electrode and the common electrode of the color filter panel 220. The alignment angle of the liquid crystal injected between the TFT panel 210 and the color filter panel 220 is changed by the electric field, so light transmittance is changed according to the changed alignment angle to obtain the desired pixels, i.e., colors. A polarizer (not shown) may be attached to both sides of the LCD panel 200 to polarize light passing through the LCD panel 200.

The printed circuit board 300, e.g., flexible printed circuit (FPC) 300, may be disposed on a lower portion of the lower fixing member 140, and an upper fixing member 400 may be mounted on the LCD panel 200 and the backlight assembly 100. That is, the upper fixing member 400 may cover the LCD panel 200 and couple with the mold frame 130 with the LCD panel 200 therebetween. As such, as the upper fixing member 400 may be closely attached to a side of the lower fixing member 140, it may be possible to firmly receive the LCD panel 200 in the LCD device 1000.

In the above configuration, the LCD device 1000 according to the present embodiment may include the protrusion 133 in the mold frame 130 of the backlight assembly 100, and may closely attach the light source to the light guide plate 110, thereby making it possible to increase the light efficiency and improve the luminance of the LCD panel 200. That is, the protrusion 133 in the mold frame 130 may closely attach the light source to the light guide plate 110 by improving the shape of the mold frame 130 of the backlight assembly 100, thereby reducing light loss and improving luminance. In addition, the light source of the backlight assembly 100 may be firmly fixed to the mold frame 130, thereby suppressing defects, e.g., excitation or separation of the printed circuit film. Moreover, it may be possible to omit an adhesive process of the printed circuit film, e.g., using a double-sided adhesive tape, thereby reducing manufacturing costs.

<Description of symbols>

| | |
|---|---|
| 100: Backlight assembly | 110: Light guide plate |
| 120: Reflective member | 130: Mold frame |
| 131: Attachment opening part | 133, 133': Protrusion |
| 135: Circuit element receiving part | 140: Lower fixing member |
| 150: FPC film | 151, 351: Connection part |
| 160: Light emitting diode | 70: Optical member |
| 80: Adhesive member | 200: Liquid crystal display panel |
| 210: Thin film transistor panel | 220: Color filter panel |
| 230, 330: Printed circuit film | 240: Integrated circuit chip |
| 250: Protective layer | 300: Printed circuit board |
| 400: Upper fixing member | 1000: LCD device |

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A backlight assembly, comprising:
   a light source;
   a light guide plate configured to receive and diffuse light emitted from the light source; and
   a mold frame including:
      a central opening part configured to receive the light guide plate,
      an attachment opening part adjacent to the central opening part, the attachment opening part being configured to receive the light source, and
      a protrusion in the attachment opening part, the protrusion contacting the light source in the attachment opening part and including an inclined edge or surface, the inclined edge or surface directly contacting the light source at least at one point, the inclined edge or surface facing the light source, and the light source being between the protrusion and the light guide plat;
   wherein the protrusion has a polygonal shape, the polygonal shape including at least:
      a first surface flush against a sidewall of the mold frame in the attachment opening,
      a second surface perpendicular to the first surface, the second surface extending from a first edge of the first surface and being parallel to the light guide plate, and
      the inclined edge or surface extending from the second surface toward a second edge of the first surface, the first and second edges of the first surface being parallel to each other and on opposite sides of the first surface.

2. The backlight as claimed in claim 1, wherein the light source is a light emitting diode.

3. The backlight as claimed in claim 1, wherein a distance from an edge of the attachment opening part contacting the protrusion to an edge of the light guide plate contacting the light source is smaller than or equal to a sum of a width of the light source and a width of the protrusion, the widths of the light source and protrusion being measured along a same direction as the distance.

4. The backlight as claimed in claim 1, wherein a contact point or a contact edge between the second surface and the inclined edge or surface, respectively, defines the direct contact between the protrusion and the light source.

5. The backlight as claimed in claim 4, wherein an angle between the light source and the inclined edge or surface is oblique, the angle being measured at a contact point or edge with the light source.

6. The backlight as claimed in claim 1, wherein the protrusion and the mold frame include a same material.

7. The backlight as claimed in claim 6, wherein the protrusion is integral with the mold frame.

8. The backlight as claimed in claim 1, wherein the protrusion is elastic.

9. The backlight as claimed in claim 1, wherein the central opening part is integral with the attachment opening part, the protrusion being on an edge of the attachment opening part and facing the central opening part.

10. The backlight as claimed in claim 9, wherein the light source is inside the attachment opening part, the light source contacting the protrusion and the light guide plate.

11. The backlight as claimed in claim 1, wherein the light source is attached to a printed circuit film, the printed circuit film and light guide plate being on opposite surfaces of the mold frame, and the light source being pressed between the protrusion and the light guide plate.

12. A liquid crystal display device, comprising:
a liquid crystal display panel; and
a backlight assembly having a light source, a light guide plate configured to receive and diffuse light emitted from the light source, and a mold frame, the mold frame including:
  a central opening part configured to receive the light guide plate,
  an attachment opening part adjacent to the central opening part, the attachment opening part being configured to receive the light source, and
  a protrusion in the attachment opening part, the protrusion contacting the light source in the attachment opening part and including an inclined edge or surface, the inclined edge or surface directly contacting the light source at least at one point, the inclined edge or surface facing the light source, and the light source being between the protrusion and the light guide plate,
wherein the protrusion has a polygonal shape, the polygonal shape including at least:
  a first surface flush against a sidewall of the mold frame in the attachment opening,
  a second surface perpendicular to the first surface, the second surface extending from a first edge of the first surface and being parallel to the light guide plate, and
  the inclined edge or surface extending from the second surface toward a second edge of the first surface, the first and second edges of the first surface being parallel to each other and on opposite sides of the first surface.

13. The liquid crystal display device as claimed in claim 12, wherein the light source is a light emitting diode.

14. The liquid crystal display device as claimed in claim 12, wherein a distance from an edge of the attachment opening part contacting the protrusion to an edge of the light guide plate contacting the light source is smaller than or equal to a sum of a width of the light source and a width of the protrusion, the widths of the light source and protrusion being measured along a same direction as the distance.

15. The liquid crystal display device as claimed in claim 12, wherein the protrusion has a tetrahedral shape with an inclined line facing the light source.

16. The liquid crystal display device as claimed in claim 12, wherein the protrusion has a pentagonal shape with an inclined surface facing the light source.

17. The liquid crystal display device as claimed in claim 12, wherein the protrusion and the mold frame include a same material.

18. The liquid crystal display device as claimed in claim 17, wherein the protrusion is integral with the mold frame.

19. The liquid crystal display device as claimed in claim 12, wherein the protrusion is elastic.

* * * * *